UNITED STATES PATENT OFFICE.

MAX HENIUS, OF CHICAGO, ILLINOIS, ASSIGNOR TO FELIX MENDELSOHN, OF CHICAGO, ILLINOIS.

ART OF TREATING ORANGES.

1,343,915.  Specification of Letters Patent.  Patented June 22, 1920.

No Drawing.  Application filed May 15, 1918. Serial No. 234,664.

*To all whom it may concern:*

Be it known that I, MAX HENIUS, a citizen of the United States, residing at Chicago, in the county of Cook and State of Illinois, have invented a new and useful Improvement in the Art of Treating Oranges, of which the following is a specification.

My invention relates to the art of preserving orange juice and will be fully understood from the following specification.

Heretofore many attempts have been made to utilize orange juice by treating it with a view to its preservation, but up to the time of my present invention it has not been possible to preserve the orange juice for any considerable length of time and at the same time retain its natural color, flavor and alimentary properties.

In carrying out the present invention, the common operation of defecating or clarifying the orange juice is not resorted to, but the orange pulp and juice is merely expressed from the orange and passed through a strainer to separate the seeds and coarser particles. To the finely divided pulp and juice, I immediately add sulfur dioxid—preferably in the form of sodium bisulfite—in the proportion of about one hundred parts to each million parts of the orange pulp and juice; or in the proportion of from 500 to 550 milligrams to each gallon of the orange pulp and juice. The orange pulp and juice so treated is then placed in bottles or other suitable containers which are sealed so that the product can be pasteurized.

I have found that just previous to pasteurization the amount of sulfur dioxid is about eighty parts to each million parts of the orange pulp and juice, and that after pasteurization said sulfur dioxid is reduced to about sixty parts, probably in consequence of its oxidation by the oxygen in the pulp or juice and in the air space within the container. Of the sixty parts of sulfur dioxid only about fifteen parts are "free;" the remaining forty-five parts having combined with the organic constituents of the orange pulp and juice. It is well known that such combined sulfur dioxid does not have the properties of free sulfur dioxid with respect to preservation and physiological effects. The sulfur dioxid is added for the primary purpose of preventing the discoloration and the deterioration in flavor which are both believed to be caused by auto-oxidation of some constituents of the orange pulp and juice by atmospheric oxygen. I have found that this auto-oxidation can be prevented by the use of the quantity of sulfur dioxid mentioned, which appears to consume most of the oxygen of the air in the container and to protect from the remaining oxygen the readily oxidizable constituents of the orange pulp and juice. The protective action of the sulfur dioxid is greatly assisted by subjecting the pulp and juice to pasteurization at the proper temperature. In practice I have found it possible to preserve the orange pulp and juice by pasteurization without adding the sulfur dioxid but the color and flavor became so changed that the product was unsatisfactory. By the addition of sulfur dioxid as specified, and by subjecting the orange pulp and juice to pasteurization at a temperature of about 55° C., I have been able to preserve the orange pulp and juice for an indefinite period of time and retain the natural color and flavor of the product.

I am aware that it has been heretofore the practice to preserve various fruit juices, among them orange juice, by the use of sulfurous acid, its anhydrid and salts and by pasteurization, but so far as is known to me the proper proportions of the preservative agent for preventing deterioration of the product without injuring or altering it in any noticeable way, chemically or physiologically, combined with pasteurization as carried out in such a manner as to render the product thoroughly sterile without injuring it, had not been discovered prior to my present invention.

While I have in the foregoing described in considerable detail a preferred process according to my invention, it will be understood that this is illustrative only for the purpose of making the invention more clear, and that my invention is not limited to the precise details given, except in so far as they are included within the terms of the accompanyng claims, in which it is my intention to claim all novelty inherent in my invention as broadly as is permissible in view of the prior art.

What I claim is—

1. A method of treating oranges which consists in expressing the juice, adding thereto an available form of sulfurous acid, in the proportion of about 80 parts per million based on the $SO_2$ content and at once pasteurizing at a temperature of between 50° and 60° C.

2. A method of treating oranges which consists in expressing the juice and pulp therefrom, treating the unclarified mixture of finely divided pulp and juice with sulfurous acid, in available form, in the proportion of about 80 parts per million based on the $SO_2$ content and at once pasteurizing at a temperature of between 50° and 60° C.

3. A method of treating oranges which consists in expressing the juice, adding thereto from 500 to 550 milligrams of sodium bisulfite per gallon, and at once pasteurizing at a temperature of between 50° and 60° C.

4. A method of treating oranges which consists in expressing the juice and pulp, adding to the unclarified mixture from 500 to 550 milligrams of sodium bisulfite per gallon, inclosing the treated product in sealed containers and finally pasteurizing at a temperature of 55° C. for a period of from 20 minutes to one hour for containers of one-half pint to one quart capacity.

5. The herein described product comprising sterile unclarified orange juice containing approximately 15 parts per million free $SO_2$ and approximately 45 parts per million combined $SO_2$.

MAX HENIUS.